US012492574B2

(12) United States Patent
Macernis

(10) Patent No.: US 12,492,574 B2
(45) Date of Patent: Dec. 9, 2025

(54) WRAP-AROUND GATE LATCH

(71) Applicant: LATCH ADVANTAGE, LLC, Deerfield Beach, FL (US)

(72) Inventor: Audrius Macernis, Victoria (AU)

(73) Assignee: LATCH ADVANTAGE, LLC, Deerfield Beach, FL (US)

( * ) Notice: Subject to any disclaimer, the term of this patent is extended or adjusted under 35 U.S.C. 154(b) by 0 days.

(21) Appl. No.: 18/655,902

(22) Filed: May 6, 2024

(65) Prior Publication Data

US 2024/0287832 A1 Aug. 29, 2024

Related U.S. Application Data

(63) Continuation of application No. 17/720,329, filed on Apr. 14, 2022, now Pat. No. 11,976,503.

(30) Foreign Application Priority Data

Jan. 19, 2022 (AU) ................................ 2022200357

(51) Int. Cl.
*E05B 9/08* (2006.01)
*E05B 65/00* (2006.01)
(Continued)

(52) U.S. Cl.
CPC ............ *E05B 9/08* (2013.01); *E05B 65/0007* (2013.01); *E05C 3/16* (2013.01); *E05C 3/006* (2013.01)

(58) Field of Classification Search
CPC ............. E05B 65/0007; E05B 15/0093; E05B 1/0038; E05B 9/08; E05B 9/082;
(Continued)

(56) References Cited

U.S. PATENT DOCUMENTS

| | | | | |
|---|---|---|---|---|
| 7,201,030 B2 * | 4/2007 | Timothy | ............. E05B 65/0007 70/135 |
| 8,646,815 B2 * | 2/2014 | Timothy | ................... E05C 3/30 292/69 |

(Continued)

FOREIGN PATENT DOCUMENTS

| | | | | |
|---|---|---|---|---|
| CN | 10137926 A * | 3/2009 | ............. E05B 57/00 |
| CN | 101379261 A | 3/2009 | |

OTHER PUBLICATIONS

Office Action dated Jul. 20, 2023 Issue in U.S. Appl. No. 17/720,329 (11 pages).

*Primary Examiner* — Christine M Mills
*Assistant Examiner* — Yahya Sidky
(74) *Attorney, Agent, or Firm* — Carter, DeLuca & Farrell LLP; George Likourezos

(57) ABSTRACT

A gate latch assembly includes a base frame, a front member, a back member, and a moving plate. The base frame is configured to attach to a gate post. The front member is configured to mount to the base frame. The front member includes a movable hook configured to engage a striker bar in a latched position and disengage a striker bar in an unlatched position. The back member is configured to mount to the base frame. The moving plate includes a first end attached to the back member and a second end protruding into the front member. The moving plate is movable to disengage the movable hook from the striker bar.

36 Claims, 14 Drawing Sheets

(51) Int. Cl.
*E05C 3/00* (2006.01)
*E05C 3/16* (2006.01)

(58) Field of Classification Search
CPC ... E05C 3/00; E05C 3/006; E05C 3/12; E05C 3/16; E05C 3/162; E05C 3/22; E05C 3/24; E05C 3/26; E05C 3/30; E05C 3/40
See application file for complete search history.

(56) References Cited

U.S. PATENT DOCUMENTS

| | | | | |
|---|---|---|---|---|
| 9,803,396 | B2 * | 10/2017 | Timothy | E05B 65/0007 |
| 11,346,130 | B1 * | 5/2022 | Timothy | E05C 3/006 |
| 11,976,503 | B2 * | 5/2024 | Macernis | E05B 53/00 |
| 2016/0215537 | A1 * | 7/2016 | Macernis | E05C 3/167 |
| 2017/0321454 | A1 * | 11/2017 | Siebert | E05B 67/383 |

* cited by examiner

WRAP-AROUND GATE LATCH

CROSS-REFERENCE TO RELATED APPLICATION

The present application is a continuation of U.S. patent application Ser. No. 17/720,329 filed on Apr. 14, 2022, now U.S. Pat. No. 11,976,503, the entire contents of which are incorporated by reference herein.

FIELD OF THE DISCLOSURE

The present invention relates to latch systems for gates, and more particularly to a universal wrap-around gate latch.

BACKGROUND OF THE DISCLOSURE

Gate latches installed on gate posts are used for securing a gate. A double-sided gate latch can be operated from two sides by opening and locking the latch from either side of the gate. Typically, a gate latch comprises a self-latching mechanism along with a manual release mechanism to lock and unlock the latch respectively. The self-latching mechanism automatically closes the gate and prevents the gate from being opened from the other side, unless the manual release mechanism is used to unlock the latch and open the gate. Such gate latches require drilling into the gate posts to make a through-hole so that the required latching components could go through the post and desired connections could be made. This allows front and back components of the gate latch to communicate for opening and locking purposes.

Also, once installed, a conventional gate latch is designed such that its direction of installation cannot be changed without removing its fasteners/screws that are fixed on the gate posts. For example, a user may want to install a gate latch on a particular type of gate posts, i.e., either on a right-sided or on a left-sided gate post. In case of an incorrect installation or error, the user may want to change the direction of installation for the correct type of gate post. In such a scenario, it becomes a challenging task for the user to change the direction of the latch assemblies from a right sided gate post to the left sided gate post or vice-versa, as this involves unfastening and then fixing all fasteners/screws back on the gate post to reinstall the latch correctly.

In view of the above, the present subject matter as disclosed herein, aims to provide a novel wrap around gate latch that can be installed on the gate post without any drilling through the post, and that is a universal gate latch that can be installed on any type of gate post.

SUMMARY

The present invention provides a wrap-around gate latch assembly comprising: a base frame formed by attaching together a front frame, a central frame, and a back frame; a front part mounted on the front frame; a back part mounted on the back frame; a first push button operably mounted on the front part; a second push button operably mounted on the back part; a movable hook provided in the front part, the movable hook engages or disengages with a striker bar in a latched position or an unlatched position respectively; wherein a moving plate is provided in parallel to the central frame, the moving plate having a first end attached to the back part and a second end going into the front part; the base frame is capable of being wrapped around a gate post to thereby allow installation of the front part, the central frame and the back part without drilling through the gate post, the first push button is operated to disengage the hook from the striker bar, and the second push button is operated to push the moving plate towards the front part thereby triggering the movable hook to disengage itself from the striker bar.

According to an embodiment of the present subject matter, the front part is perpendicularly attached to one end of the central frame and the back part is perpendicularly attached to another end of the central frame to form the base frame.

According to an embodiment of the present subject matter, wherein the back part comprises: a back frame to be fixed on the gate post; the second push button having a sleeve structure; a protruded element provided on outer surface of the sleeve structure; and the moving plate having a slit on the first end; wherein the slit on the first end accommodates the protruded element to thereby attach the moving plate to the second push button, and the sleeve structure with the attached moving plate is inserted into the back frame to attach the moving plate to the back part, and to thereby allow the push button, upon being operated, to push the moving plate towards the front part.

According to an embodiment of the present subject matter, the front part is further having a through-hole for using a padlock.

According to an embodiment of the present subject matter, the front part, the central frame, and the back part are together installed around the gate post to form a double-sided gate latch.

According to an embodiment of the present subject matter, without the central frame and the back part, the front part is installed around the gate post to form a single-sided gate latch.

According to an embodiment of the present subject matter, the moving plate is capable of communicating between the front part and the back part while moving in parallel to the central frame, by having the first end attached to the back part and the second end going into the front part.

According to an embodiment of the present subject matter, each of the first push button and the second push button is a key operated push button.

According to an embodiment of the present subject matter, each of the first push button and the second push button is a keyless push button.

According to an embodiment of the present subject matter, the front part is adapted to be installed on any type of the gate post, including a right-sided gate post and a left sided gate post.

According to an embodiment of the present subject matter, the front part is adapted to be detached from the base frame and thereafter to be turned upside down for changing installation position of the front part based on type of the gate post.

According to an embodiment of the present subject matter, the back part is adapted to be installed on any type of the gate post, including a right-sided gate post and a left sided gate post.

According to an embodiment of the present subject matter, the back part is adapted to be detached from the base frame and thereafter to be turned upside down for changing installation position of the front part based on type of the gate post.

According to an embodiment of the present subject matter, the striker bar is a horizontal rod protruding outside of a striker assembly, the striker assembly adapted to be mounted on a gate to be latched.

Other objects and advantages of the embodiments herein will become readily apparent from the following detailed description taken in conjunction with the accompanying drawings.

BRIEF DESCRIPTION OF THE DRAWING

Like reference numerals refer to like parts throughout the description of several views of the drawings.

FIGURES REFERENCE NUMERALS

Figure 1:
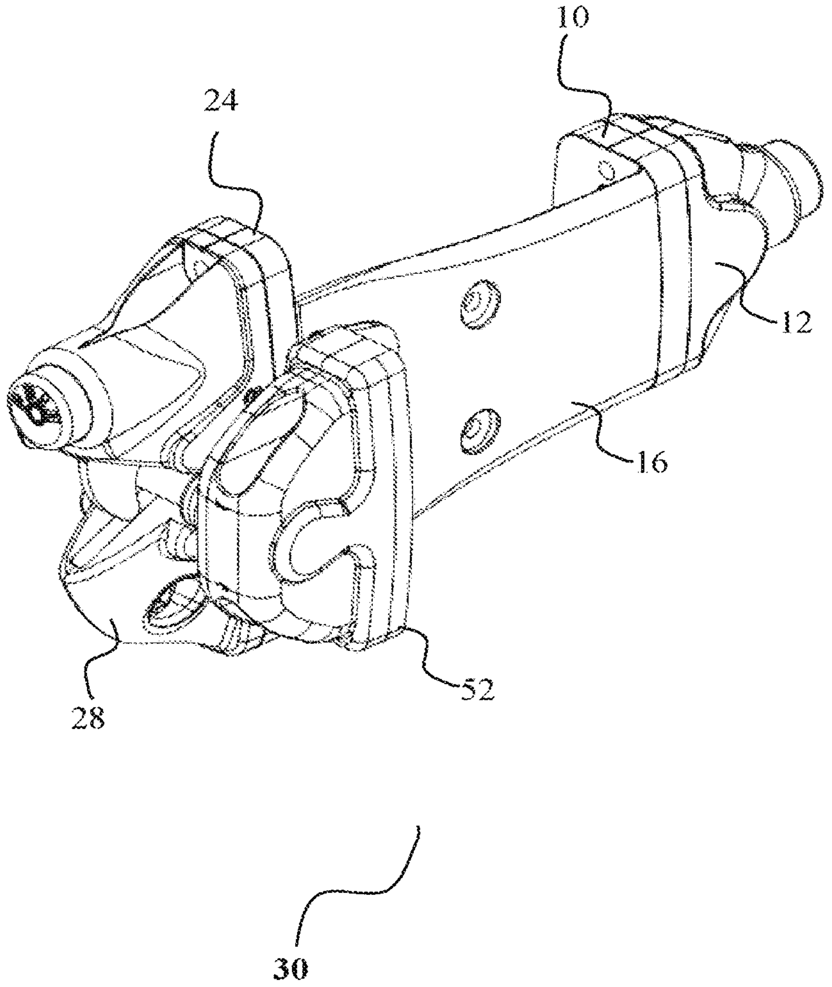
FIG. 1, according to an embodiment of the present invention, is a perspective view of the wrap-around gate latch used as a double-sided gate latch along with the striker assembly.

10 Back Frame
12 Back Part
14 Base Frame
16 Central Frame
18 Double-Sided Gate Latch
20 First End of the Moving Plate
22 First Push Button
24 Front Frame
28 Front Part
30 Gate Latch Assembly
34 Movable Hook
36 Moving Plate
38 Protruded Element
40 Fasteners or Screws
42 Second End of the Moving Plate
44 Second Push Button
46 Single Sided Gate Latch
48 Sleeve Structure
50 Slit
52 Striker Assembly
54 Striker Bar
56 Through-Hole

DETAILED DESCRIPTION OF THE INVENTION

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

Figure 2:
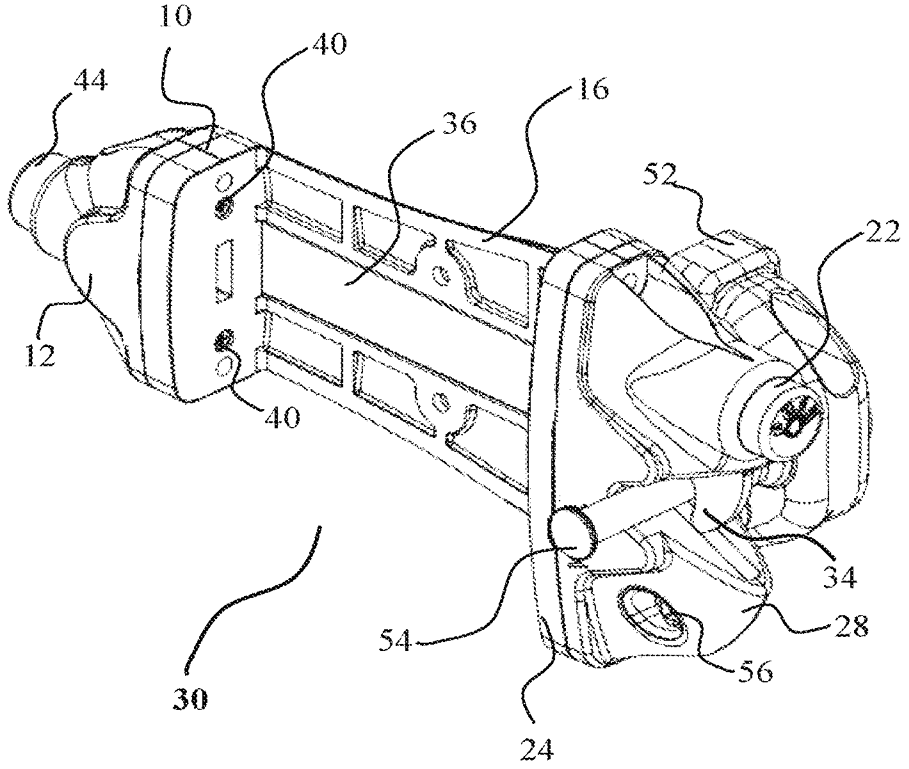
FIG. 2, according to an embodiment of the present invention, is another perspective view of the wrap-around gate latch used as a double-sided gate latch along with the striker assembly.
Figure 3:
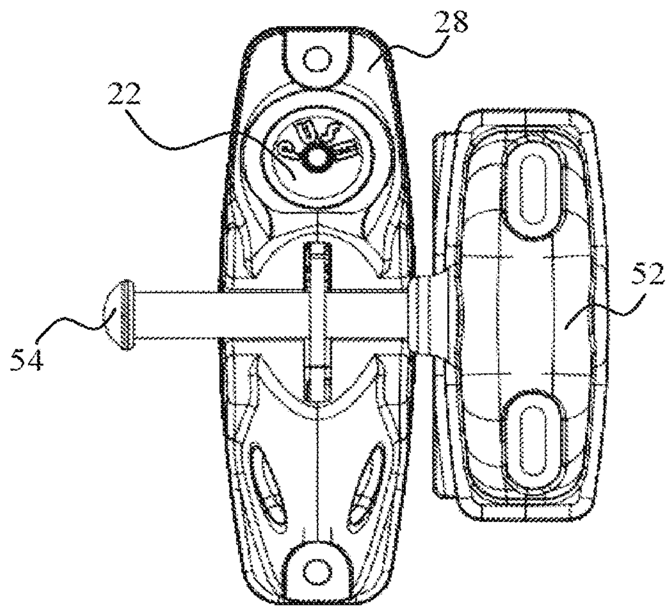
FIG. 3, according to an embodiment of the present invention, is a top view of the wrap-around gate latch along with the striker assembly.
Figure 4:
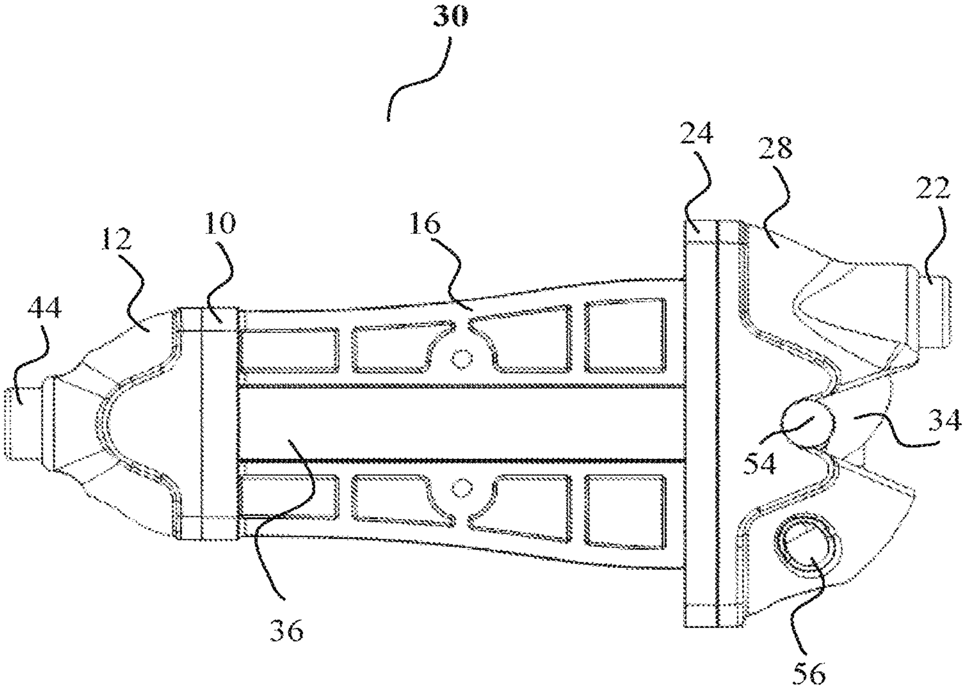
FIG. 4, according to an embodiment of the present invention, is a cross-sectional view of the base frame of the wrap-around gate latch.
Figure 5:
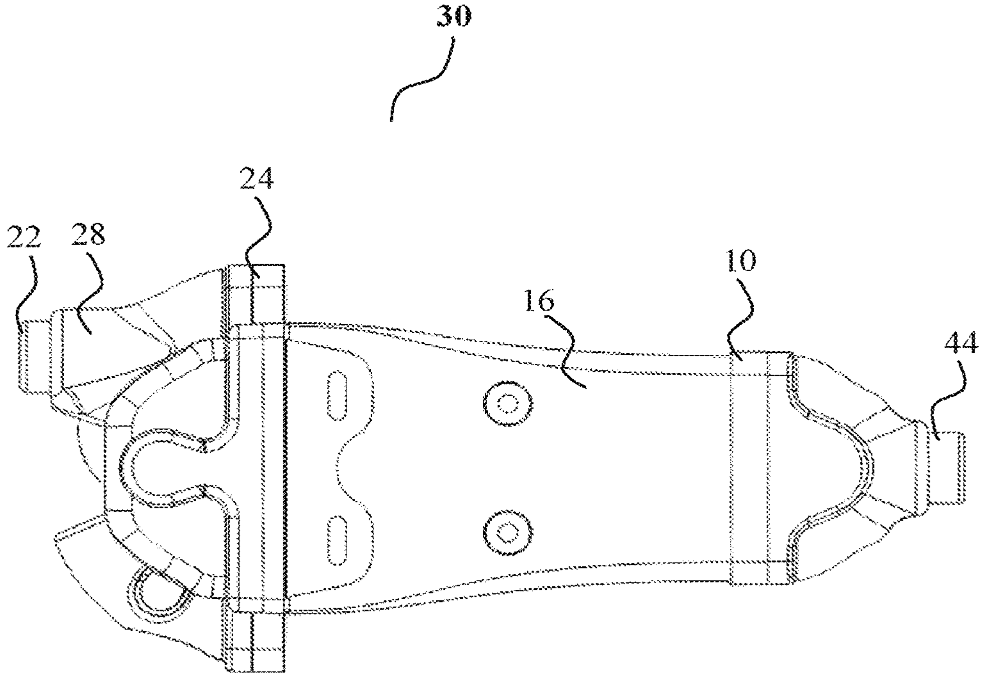
FIG. 5, according to an embodiment of the present invention, is another cross-sectional view of the base frame of the wrap-around gate latch.
Figure 6:
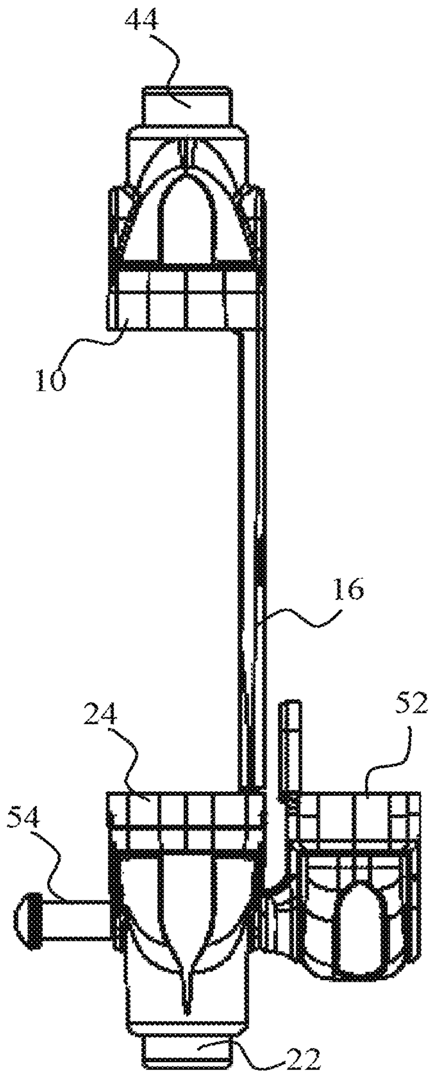
FIG. 6, according to an embodiment of the present invention, is a side view of the base frame of the wrap-around gate latch along with the striker assembly.

FIG. 1 and FIG. 2, according to an embodiment of the present invention, show different perspective views of the wrap-around gate latch used as a double-sided gate latch along with the striker assembly. FIG. 3, according to an embodiment of the present invention, is a top view of the wrap-around gate latch along with the striker assembly. FIG. 4 and FIG. 5, according to an embodiment of the present invention, are the cross-sectional views of the base frame of the wrap-around gate latch; while FIG. 6, shows a side view of the base frame of the wrap-around gate latch along with the striker assembly.

Referring to FIGS. 1-6, the wrap-around gate latch assembly 30 comprises a base frame 14 formed by attaching together a front frame 24, a central frame 16, and a back frame 10. The front frame 24 is perpendicularly attached to one end of the central frame 16. The back frame 10 is perpendicularly attached to another end of the central frame 16 to form the base frame 14. The front frame 24, the central frame 16 and the back frame 10 are attached to form a 'C' shaped base frame 14 that can be wrapped around a gate post and can be fixed on it using fasteners/screws 40. The base frame 14 is thus capable of being wrapped around a gate post to thereby allow installation of a front part 28, a central frame 16 and a back part 12 on itself (i.e., the base frame 14), without drilling through the gate post. The front part 28 is mounted on the front frame 24 that is fixed on the gate post. The front part 28 is perpendicular to the surface of the front frame 24. Similarly, the back part 12 is mounted on the back frame 10. The back part 12 is perpendicular to the surface of the back frame 10. The front frame 24, the central frame 16 and the back frame 10 are fixed together as a base frame 14 on the gate post, to install all the detachable components of the present gate latch assembly 30.

A first push button 22 is operably mounted on the front part 28 which can be operated by a user to release the latch. A second push button 44 is also provided to allow the gate latch to function as a double-sided gate latch 18. The second push button 44 is operably mounted on the back part 12. Further, a movable hook 34 is provided in the front part 28. The movable hook 34 engages or disengages itself with a striker bar 54 in a latched position or an unlatched position respectively. The movable hook 34 is capable of self-engaging with the striker bar 54, as and when the striker bar 54 comes in parallel contact with the movable hook 34 while closing the gate. The movable hook 34 is provided in a striker assembly 52 or striker housing. The striker bar 54 is a horizontal rod protruding outside of the striker assembly 52, the striker assembly 52 adapted to be mounted or fixed on a gate to be latched.

According to the embodiments of the present invention, a single moving plate 36 is provided in parallel to the central frame 16. The moving plate 36 is an elongated plate having two ends. A first end 20 of the moving plate 36 is attached to the back part 12 and a second end 42 is allowed to go into the front part 28. As mentioned earlier, while closing the gate, the movable hook 34 self-engages with the striker bar 54, as and when the striker bar 54 strikes the movable hook 34 to latch the gate. The movable hook 34 is said to be in a latched position when it is holding the striker bar 54. The movable hook 34 can be moved in upward direction to disengage it with the striker bar 54 by operating either of the two push buttons. The first push button 22 can be operated by pushing it to disengage the hook 34 from the striker bar 54. The second push button 44 is operated to push the moving plate 36 towards the front part 28 thereby triggering the movable hook 34 to disengage itself from the striker bar 54.

In addition to the first push button 22 and the movable hook 34, the front part 28 is also provided a through-hole 56 for using a padlock. The padlock may be used with the latch assembly to lock the gate.

Figure 7A:
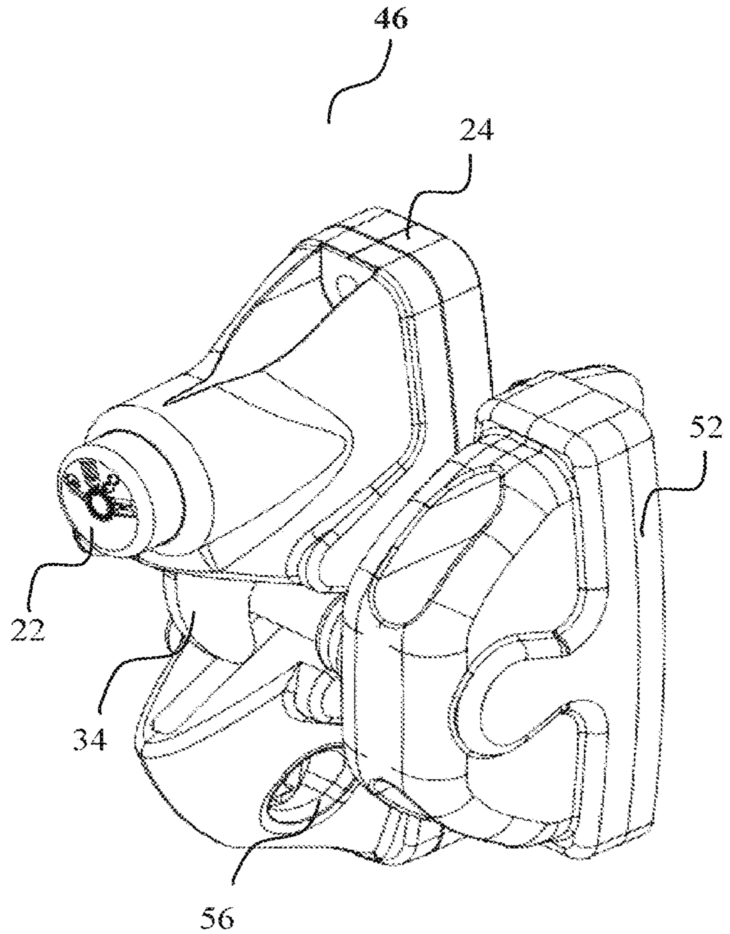
FIG. 7*a*, according to an embodiment of the present invention, is a perspective view of the wrap-around gate latch used as a single-sided gate latch along with the striker assembly.
Figure 7B:
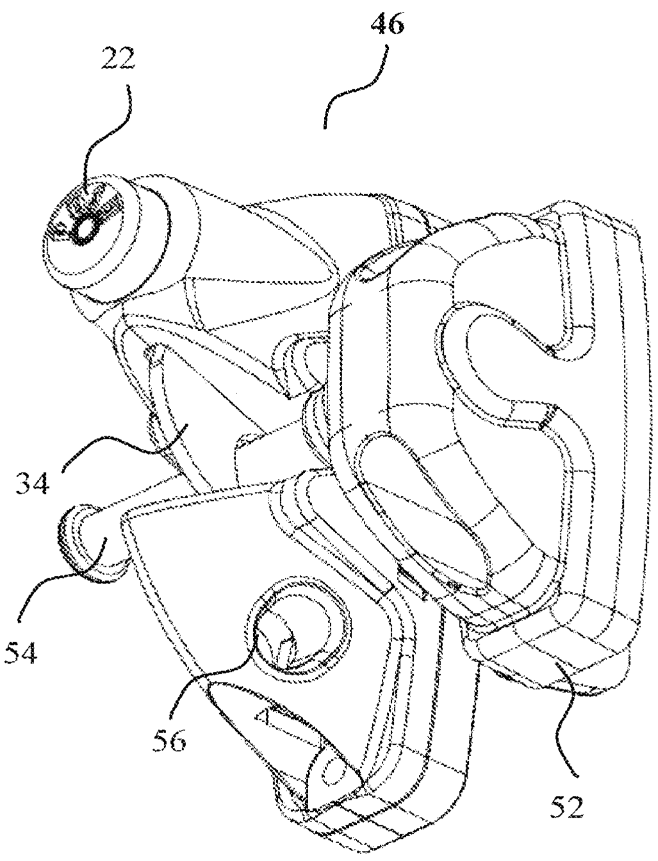
FIG. 7*b*, according to an embodiment of the present invention, is another perspective view of the wrap-around gate latch used as a single-sided gate latch along with the striker assembly.

FIG. 7*a* and FIG. 7*b*, according to an embodiment of the present invention, are perspective views of the wrap-around gate latch used as a single-sided gate latch along with the striker assembly.

According to the preferred embodiment of the present subject matter, the base frame 14 having the front part 28 and the back part 12 are together installed around the gate post to form a double-sided gate latch 18. In one embodiment, the wrap-around gate latch can be used as a single-sided gate latch 46 wherein the front part 28 and the striker assembly 52 are installed on the gate post and the gate respectively. The wrap-around gate latch, when installed only with the front part 28, i.e., without the central frame 16 and the back part 12, forms a single-sided gate latch 46. The single-sided gate latch 46 allows the user to save cost as it involves lesser components.

Figure 8:
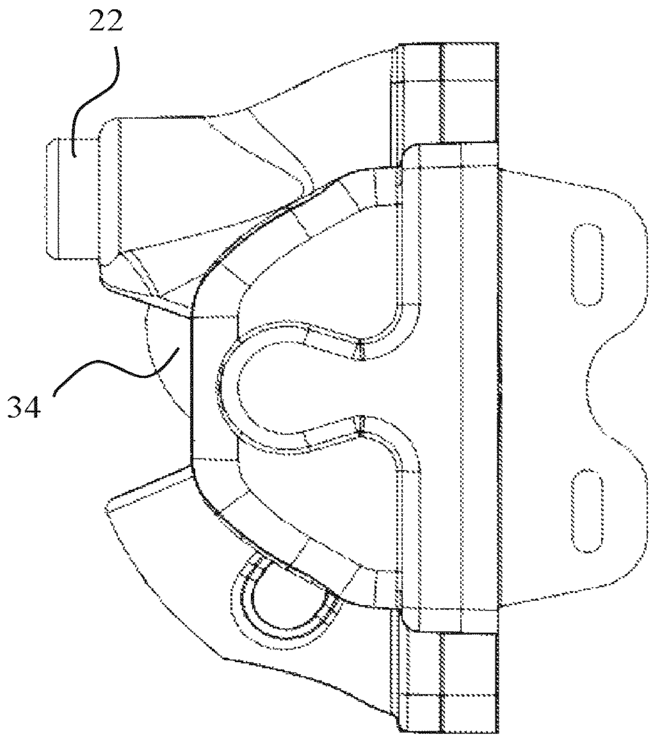
FIG. 8, according to an embodiment of the present invention, is a cross-sectional view of the front part the wrap-around gate latch.
Figure 9:
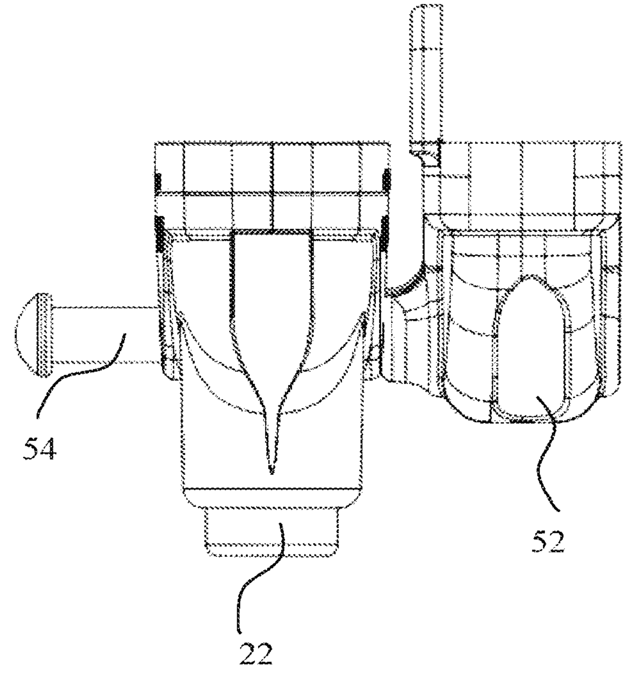
FIG. 9, according to an embodiment of the present invention, is a side view of the front part of the wrap-around gate latch along with the striker assembly.

FIG. 8 and FIG. 9, according to an embodiment of the present invention, respectively show a cross-sectional view and a side view of the front part 28 of the wrap-around gate latch along with the striker assembly 52. According to an embodiment of the present subject matter, the front part 28 is adapted to be installed on any type of the gate post, including a right-sided gate post and a left sided gate post. As described above, the front part 28 is installed on front portion of base frame 14, i.e., the front frame 24. The front frame 24 can be fixed on the gate post with the help of fasteners/screws 40. The front part 28 also comprises the first push button 22 and the movable hook 34. The edges of the front frame 24 are designed to have grooves to receive the front part 28, and consequently, does not require any fasteners/screws 40 to attach the front part 28 to it. Therefore, the front frame 24 can be fixed on the gate post, while the front part 28 can be removably attached to the front frame 24. The front part 28 can easily be detached from the base frame 14 and can be reattached to it in the same easy way. In situations when users are required to change the installation direction of an already installed gate latch, they may easily remove the front part 28 from the base frame 14 and reattach the removed part after turning it upside down for changing installation position based on type of the gate post. Similarly, the back part 12 can be removed and turned upside down to change its position or direction of installation from the left-sided gate post to the right sided gate post, or vice versa. The design of the latch assembly having removable or detachable components facilitates the users to easily change the components without requiring them to remove the fasteners/screws 40 from the gate post and refix the fasteners/screws 40.

Figure 10A:
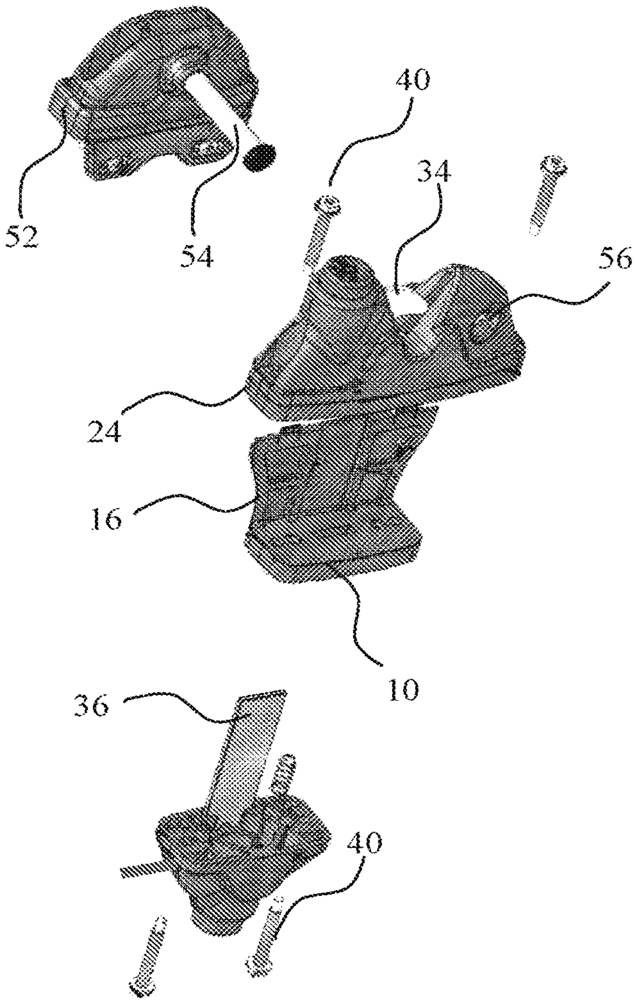
FIG. 10*a*, according to an embodiment of the present invention, is a three-dimensional exploded view of the wrap-around gate latch used as a double-sided gate latch along with the striker assembly.
Figure 10B:
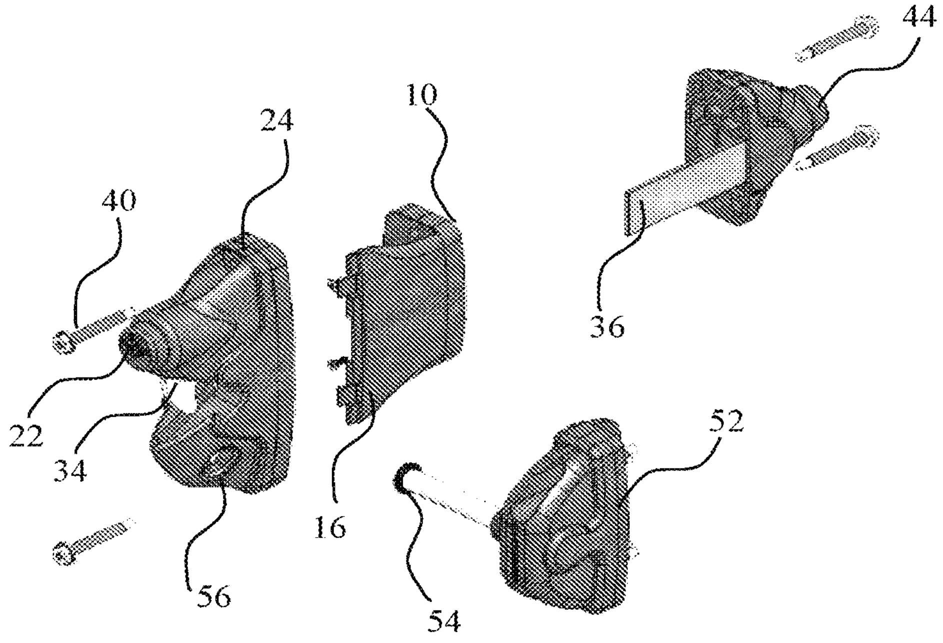
FIG. 10*b*, according to an embodiment of the present invention, is another three-dimensional exploded view of the wrap-around gate latch used as a double-sided gate latch along with the striker assembly.
Figure 11:
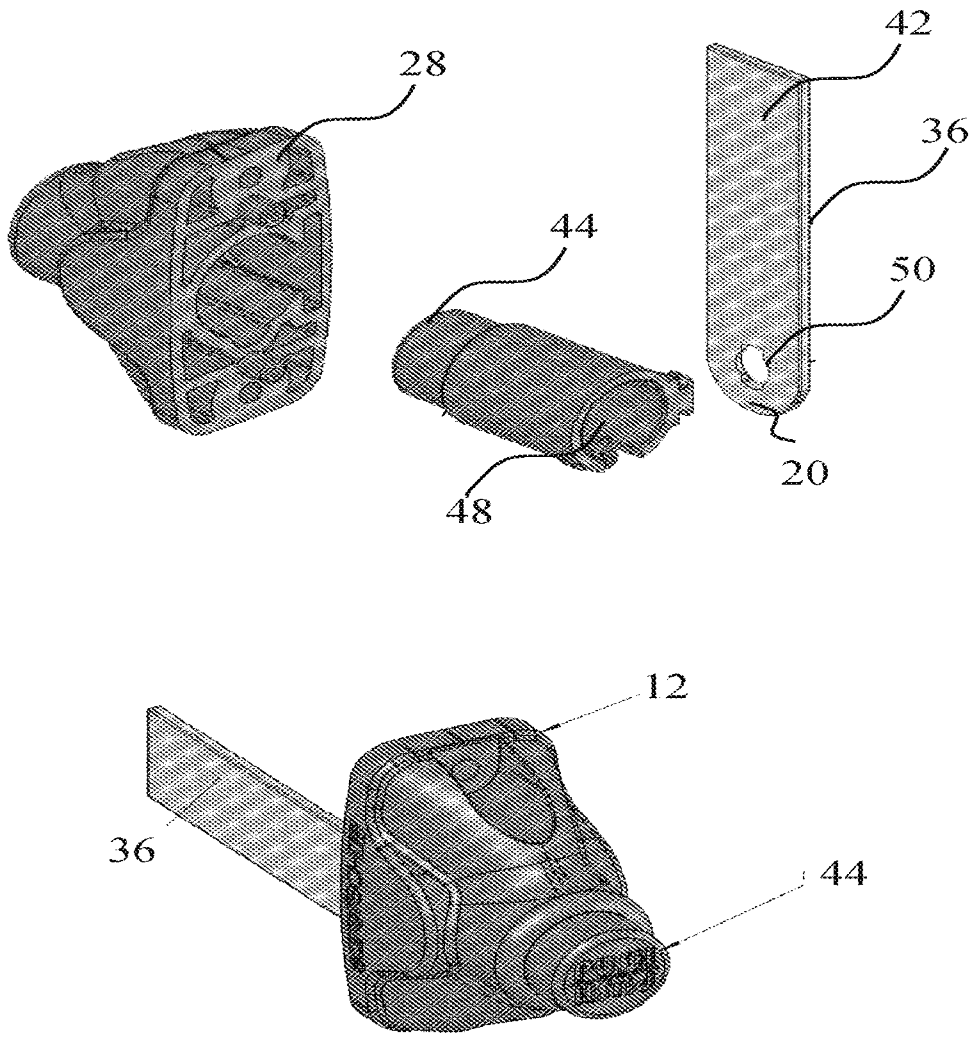
FIG. 11, according to an embodiment of the present invention, is a three-dimensional view showing components of the back part and the moving plate of the wrap-around gate latch.
Figure 12:
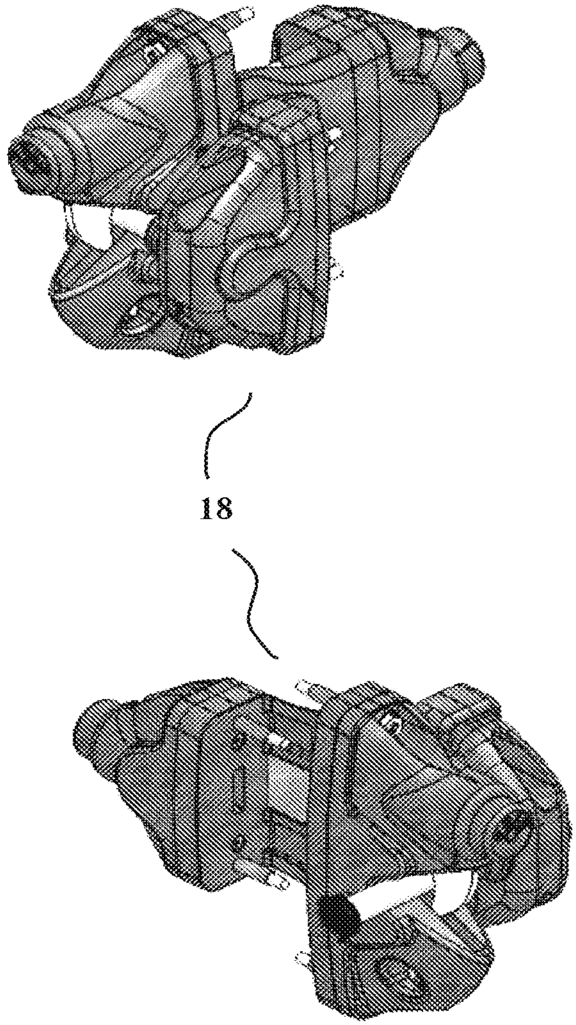
FIG. 12, according to an embodiment of the present invention, is a three-dimensional view of the wrap-around gate latch used as a double-sided gate latch along with the striker assembly.

FIG. 10*a* and FIG. 10*b*, according to an embodiment of the present invention, show three-dimensional exploded view of the wrap-around gate latch used as a double-sided gate latch along with the striker assembly. FIG. 11, according to an embodiment of the present invention, is a three-dimensional view showing components of the back part and the moving plate of the wrap-around gate latch. FIG. 12, according to an embodiment of the present invention, is a three-dimensional view of the wrap-around gate latch used as a double-sided gate latch along with the striker assembly.

Referring to the above FIGs., the back part 12 can be mounted on the back frame 10 that can be fixed on the gate post. The back part 12 comprises the second push button 44 having a sleeve structure 48. A protruded element 38 is provided on outer surface of the sleeve structure 48 and the moving plate 36 is provided with a slit 50 on its first end 20. The slit 50 on the first end 20 accommodates the protruded element 38 to thereby attach the moving plate 36 to the second push button 44. The sleeve structure 48 with the attached moving plate 36 is inserted into the back frame 10 to attach the moving plate 36 to the back part 12. This allows the push button, upon being operated, to push the moving plate 36 towards the front part 28. According to an embodiment of the present subject matter, the moving plate 36 is capable of communicating between the front part 28 and the back part 12 while moving in parallel to the central frame 16, by having the first end 20 attached to the back part 12 and the second end 42 going into the front part 28.

According to an embodiment of the present subject matter, each of the first push button 22 and the second push button 44 is a key operated push button. In another embodiment, each of the first push button 22 and the second push button 44 is a keyless push button.

The embodiments of the present invention thus provide a durable, light-weight, universal latch that can be used as a double-sided 18 as well as a single-sided gate latch 46, and which is designed to be installed on the gate post without any drilling through the post, while connecting the front and back parts 28, 12 of the latch assembly together.

The gate latch as disclosed herein overcomes the limitation of conventional latches that are complicated in design and are bulky. Such gate latches are also complicated in their installation, and the users find difficulty in changing the installation direction from left to right-sided gate post or vice versa. The conventional double sided gate latches as known prior to the present invention, require drilling in to the post to make a hole so that required connections could go through the post and the latch components could thereby communicate for opening and locking purposes. The latching components of the present invention however, do not require any drilling through the post due to its 'C' shaped base frame 14 that can be easily wrapped around the gate post and all the latch components can be mounted on said base frame 14. Further, the front part 28 and back part 12 of the present latch communicate via one single moving plate 36 that is in shape of a flat rod, that wraps on the side of the gate post and need not be drilled through the gate post.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

The invention claimed is:

1. A gate latch assembly, comprising:
- a base frame configured to attach to a gate post;
- a front member configured to mount to the base frame, the front member including a movable hook configured to engage a striker bar in a latched position and disengage a striker bar in an unlatched position;
- a back member configured to mount to the base frame; and
- a moving plate including a first end attached to the back member and a second end protruding into the front member, wherein the moving plate is movable to disengage the movable hook from the striker bar, and wherein the moving plate is configured to be disposed outside of the gate post.

2. The gate latch assembly of claim 1, wherein the base frame includes a front portion, a central portion, and a back portion.

3. The gate latch assembly of claim 2, wherein the front member is mounted to the front portion.

4. The gate latch assembly of claim 2, wherein the back member is mounted to the back portion.

5. The gate latch assembly of claim 2, wherein the moving plate is disposed at least one of adjacent to, parallel to, or within the central portion of the base frame.

6. The gate latch assembly of claim 1, further including a locking mechanism, wherein the locking mechanism, when locked, is configured to prevent the movable hook from disengaging the striker bar.

7. The gate latch assembly of claim 6, wherein the locking mechanism is key-operated.

8. The gate latch assembly of claim 1, wherein the base frame is configured to attach to the gate post such that the front member and the back member are mounted to the base frame without drilling through the gate post.

9. The gate latch assembly of claim 1, further including a first push button operably mounted to the front member, wherein the first push button, when pushed, disengages the movable hook from the striker bar.

10. The gate latch assembly of claim 9, wherein the first push button is key operated.

11. The gate latch assembly of claim 1, further including a second push button operably mounted to the back member, wherein the second push button, when pushed, moves the moving plate to disengage the movable hook from the striker bar.

12. The gate latch assembly of claim 11, wherein the second push button is key operated.

13. The gate latch assembly of claim 1, wherein:
- the back member includes a protruded element;
- the first end of the moving plate includes a slit, wherein the slit at least partially accommodates the protruded element; and
- the moving plate is operably connected to the back member by the protruded element.

14. The gate latch assembly of claim 13, wherein the protruded element is connected to an opening mechanism of the back member, wherein operation of the opening mechanism moves the moving plate to disengage the movable hook from the striker bar.

15. The gate latch assembly of claim 1, wherein the front member includes a through-hole configured for use with a padlock.

16. The gate latch assembly of claim 1, wherein the front member is configured to be installed on at least one of a right-sided gate post or a left-sided gate post.

17. The gate latch assembly of claim 1, wherein the front member is configured to mount to the base frame in at least one of a right-side up or an inverted position.

18. The gate latch assembly of claim 1, wherein the back member is configured to be installed on at least one of a right-sided gate post or a left-sided gate post.

19. The gate latch assembly of claim 1, wherein the back member is configured to mount to the base frame in at least one of a right-side up or an inverted position.

20. The gate latch assembly of claim 1, further including a striker assembly, wherein the striker bar protrudes from the striker assembly, and wherein the striker assembly is configured to attach to a gate.

21. A gate latch assembly, comprising:
- a base frame configured to attach to a gate post;
- a front member configured to mount to the base frame, the front member including a movable hook configured to engage a striker bar in a latched position and disengage a striker bar in an unlatched position; and
- a moving plate including an end protruding into the front member, wherein the moving plate is movable to disengage the movable hook from the striker bar, and wherein the moving plate is configured to be disposed outside of the gate post.

22. The gate latch assembly of claim 21, wherein the base frame includes a front portion, a central portion, and a back portion.

23. The gate latch assembly of claim 22, wherein the front member is mounted to the front portion.

24. The gate latch assembly of claim 22, further including a back member, wherein the back member is mounted to the back portion, and wherein an opposite end of the moving plate is attached to the back member.

25. The gate latch assembly of claim 24, further including a back push button operably mounted to the back member, wherein the back push button, when pushed, moves the moving plate to disengage the movable hook from the striker bar.

26. The gate latch assembly of claim 25, wherein the second push button is key operated.

27. The gate latch assembly of claim 25, wherein the back push button includes a protruded element, and wherein the opposite end of the moving plate operably connects to the back member via the protruded element.

28. The gate latch assembly of claim 22, wherein the moving plate is disposed at least one of adjacent to, parallel to, or within the central portion of the base frame.

29. The gate latch assembly of claim 21, wherein the front member further includes a locking mechanism, wherein the locking mechanism, when locked, is configured to prevent the movable hook from disengaging the striker bar.

30. The gate latch assembly of claim 29, wherein the locking mechanism is key-operated.

31. The gate latch assembly of claim 21, further including a first push button operably mounted to the front member, wherein the first push button, when pushed, disengages the movable hook from the striker bar.

32. The gate latch assembly of claim 28, wherein the first push button is key operated.

33. The gate latch assembly of claim 21, wherein the front member includes a through-hole configured for use with a padlock.

34. The gate latch assembly of claim 21, wherein the front member is configured to be installed on at least one of a right-sided gate post or a left-sided gate post.

35. The gate latch assembly of claim 21, wherein the front member is configured to mount to the base frame in at least one of a right-side up or an inverted position.

36. The gate latch assembly of claim 21, further including a striker assembly, wherein the striker bar protrudes from the striker assembly, and wherein the striker assembly is configured to attach to a gate.

* * * * *